US 10,739,213 B2

(12) United States Patent
Hoshika et al.

(10) Patent No.: US 10,739,213 B2
(45) Date of Patent: Aug. 11, 2020

(54) TEMPERATURE AND HUMIDITY SENSOR

(71) Applicant: Hitachi Automotive Systems, Ltd., Hitachinaka-shi, Ibaraki (JP)

(72) Inventors: Hiroaki Hoshika, Hitachinaka (JP); Takayuki Saito, Hitachinaka (JP); Takayuki Yogo, Hitachinaka (JP); Takahiro Miki, Hitachinaka (JP); Takeo Hosokawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 791 days.

(21) Appl. No.: 14/903,226

(22) PCT Filed: Jul. 4, 2014

(86) PCT No.: PCT/JP2014/067858
§ 371 (c)(1),
(2) Date: Jan. 6, 2016

(87) PCT Pub. No.: WO2015/005231
PCT Pub. Date: Jan. 15, 2015

(65) Prior Publication Data
US 2016/0356656 A1  Dec. 8, 2016

(30) Foreign Application Priority Data

Jul. 10, 2013  (JP) ................................ 2013-144101
Jul. 10, 2013  (JP) ................................ 2013-144103

(51) Int. Cl.
*G01K 13/02* (2006.01)
*F02M 35/10* (2006.01)
*F02D 41/28* (2006.01)

(52) U.S. Cl.
CPC ......... *G01K 13/02* (2013.01); *F02M 35/1038* (2013.01); *F02M 35/10091* (2013.01);
(Continued)

(58) Field of Classification Search
CPC ............. G01K 13/02; G01K 2013/024; G01K 2205/02; F02M 35/10393;
(Continued)

(56) References Cited

U.S. PATENT DOCUMENTS

2002/0023486 A1  2/2002  Watanabe et al.
2007/0256493 A1  11/2007  Okamoto et al.
(Continued)

FOREIGN PATENT DOCUMENTS

CN  100529683 C  8/2009
CN  101650204 A  2/2010
(Continued)

OTHER PUBLICATIONS

Chinese-language Office Action issued in counterpart Chinese Application No. 201480039333.3 dated Mar. 3, 3017 with English translation (16 pages).

(Continued)

*Primary Examiner* — Lisa M Caputo
*Assistant Examiner* — Janice M Soto
(74) *Attorney, Agent, or Firm* — Crowell & Moring LLP

(57) ABSTRACT

In order to provide a temperature and humidity sensor with improved reliability, the temperature and humidity sensor in which all or part of a case of the temperature and humidity sensor is inserted into a main duct for causing gas to pass through and which detects humidity of the gas, includes: a first sub-passage configured as a part of the case, a part of the gas passing through the main duct flowing in substantially the same direction as a flow in the main duct; a throttle section provided between an inlet and an outlet of the first sub-passage and on an inner surface of the first sub-passage, the throttle section having a throttle whose cross-sectional area is smaller than an average cross-sectional area of the entire first sub-passage; and a second sub-passage which
(Continued)

connects an upstream side and a downstream side of the throttle section and is different from the first sub-passage. The first sub-passage and an inlet and an outlet of the second sub-passage are connected via respective connection ports, and the connection port between the inlet of the second sub-passage and the first sub-passage or the connection port between the outlet of the second sub-passage and the first sub-passage is provided on a side where a throttle is not provided when viewed from an axis in an upstream and downstream direction of the flow in the first sub-passage.

10 Claims, 8 Drawing Sheets

(52) U.S. Cl.
CPC .......... *F02M 35/10249* (2013.01); *F02M 35/10393* (2013.01); *F02D 2041/285* (2013.01); *F02D 2200/0414* (2013.01); *F02D 2200/0418* (2013.01); *F02D 2400/18* (2013.01); *G01K 2013/024* (2013.01); *G01K 2205/02* (2013.01)

(58) Field of Classification Search
CPC ....... F02M 35/10249; F02M 35/10091; F02M 35/1038; F02D 2041/285; F02D 2200/0414; F02D 2400/18; F02D 2200/0418
See application file for complete search history.

(56) References Cited

U.S. PATENT DOCUMENTS

| 2010/0031737 | A1  | 2/2010 | Saito et al. |
| 2012/0079879 | A1* | 4/2012 | Saito .................... G01F 1/6842 |
|              |     |        | 73/114.33 |

FOREIGN PATENT DOCUMENTS

| EP | 1 128 168 A2 | 8/2001 |
| JP | 7-5036 U | 1/1995 |
| JP | 7-232543 A | 9/1995 |
| JP | 2000-351312 A | 12/2000 |
| JP | 3137525 B2 | 2/2001 |
| JP | 2001-311637 A | 11/2001 |
| JP | 2008-286019 A | 11/2008 |
| JP | 2010-181354 A | 8/2010 |

OTHER PUBLICATIONS

International Search Report (PCT/ISA/210) issued in counterpart International Application No. PCT/JP2014/067858 dated Oct. 14, 2014, with English translation (Five (5) pages).
Japanese Written Opinion (PCT/ISA/237) issued in counterpart International Application No. PCT/JP2014/067858 dated Oct. 14, 2014 (Three (3) pages).

* cited by examiner

TEMPERATURE AND HUMIDITY SENSOR

TECHNICAL FIELD

The present invention relates to a temperature and humidity sensor, and particularly to a temperature and humidity sensor inserted into an intake pipe coupled to a combustion chamber of an internal combustion engine in an automobile field.

BACKGROUND ART

In recent years, a temperature and humidity sensor has been utilized in a vehicle. Also, there are techniques described in PTL 1 and PTL 2 as a background art of this technical field. PTL 1 describes "provision of "Air Conditioning Device for Automobile" formed by integrally incorporating a temperature sensor and a humidity sensor in a control device without a lead wire or a dedicated casing". Further, PTL 2 describes "a device which is capable of accurately detecting temperature and humidity and is also made compact". In other words, it is important that the temperature and humidity sensor is miniaturized and integrated in this way.

CITATION LIST

Patent Literature

PTL 1: JP 3137525 B1
PTL 2: JP 2000-351312 A

SUMMARY OF INVENTION

Technical Problem

As mentioned above, it is important that the temperature and humidity sensor is miniaturized. However, in a case where the temperature and humidity sensor, especially the humidity sensor, is utilized to control an internal combustion engine, not only miniaturization, but also measures against contamination on a humidity sensing part or measures for preventing waterdrop adhesion are important to secure long-term reliability. For example, it is general to have a structure in which a sensor chamber itself is spatially sealed by a membrane film, thereby blocking contaminants and allowing only steam components to pass. However, in this structure, since the membrane film has large ventilation resistance, there is a problem in that air exchange within the sensor chamber is not sufficiently performed and temperature/humidity response from the sensor is significantly deteriorated.

Further, even when the membrane film is removed and a humidity sensor of a type which is relatively resistant to contamination is used, when contaminants directly collide with the sensor, a humidity detection error caused by the contamination appears. Accordingly, a complicated passage for avoiding direct collision with the contaminants is required, and there is a problem in that air or gas in a vicinity of the sensor cannot be sufficiently exchanged due to the increase in fluid resistance of the passage.

An object of the present invention is to provide a temperature and humidity sensor with improved reliability.

Solution to Problems

In order to solve the above-described problems, for example, a configuration described in an aspect is adopted.

The present application includes a plurality of solutions to the problems, and one example thereof is the temperature and humidity sensor in which all or part of a case of the temperature and humidity sensor is inserted into a main duct for causing gas to pass through and which detects humidity of the gas, including: a first sub-passage configured as a part of the case, a part of the gas passing through the main duct flowing in substantially the same direction as a flow in the main duct; a throttle section provided between an inlet and an outlet of the first sub-passage and on an inner surface of the first sub-passage, the throttle section having a throttle whose cross-sectional area is smaller than an average cross-sectional area of the entire first sub-passage; and a second sub-passage which connects an upstream side and a downstream side of the throttle section and is different from the first sub-passage. The first sub-passage and an inlet and an outlet of the second sub-passage are connected via respective connection ports, and the connection port between the inlet of the second sub-passage and the first sub-passage or the connection port between the outlet of the second sub-passage and the first sub-passage is provided on a side where a throttle is not provided when viewed from an axis in an upstream and downstream direction of the flow in the first sub-passage.

Advantageous Effects of Invention

According to the present invention, a temperature and humidity sensor with improved reliability can be provided.

DESCRIPTION OF EMBODIMENTS

Figure 1:
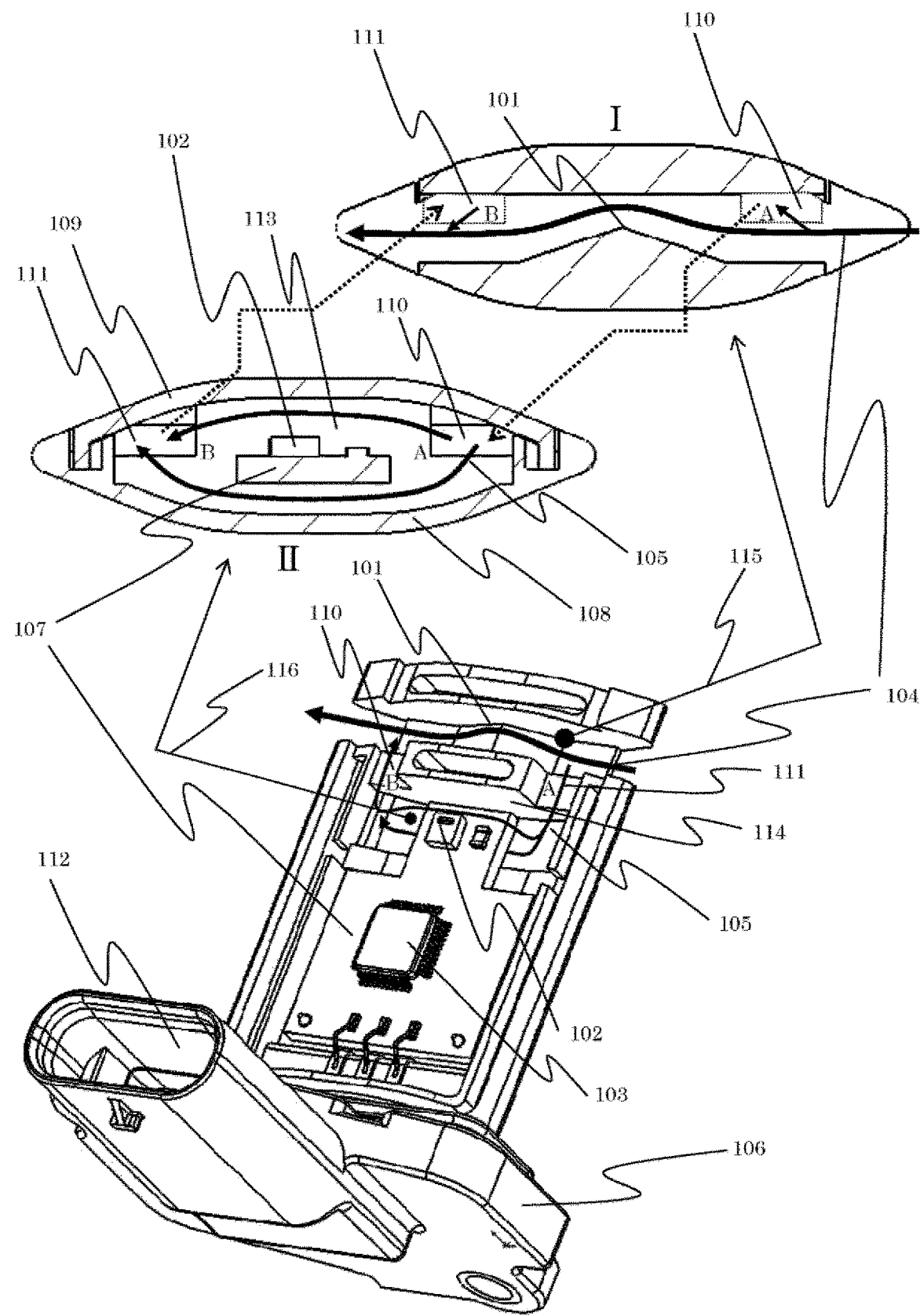
FIGS. 1-I and 1-II are an example of a configuration diagram of a humidity sensor.

Hereinafter, embodiments of the present invention will be described by using FIGS. 1-I to 5D.

Embodiment 1

An example of positions for connecting a plurality of sub-passages which rationally reduces contaminants reaching a humidity detection element is described in the present embodiment. FIGS. 1-I and 1-II are an example of a configuration diagram of a temperature and humidity sensor of the present embodiment.

The temperature and humidity sensor is mainly configured by a sensor flange 106, a sensor housing 108, and a circuit cover 109. The flange 106 is exposed to outside of a gas duct and supports the sensor housing 108 inserted into the duct from one side. The sensor flange 106 normally has a structure which secures air tightness between the duct and the outside and is integrally configured with the sensor housing 108 in many cases. A circuit board 107, on which a humidity detection element 102, an integrated circuit 103, and the like are mounted, is fixed to an inside of the sensor housing 108. The humidity detection element 102 is mounted at a tip of the circuit board 107 and is partitioned from a second sub-passage 116 by a circuit chamber/second sub-passage partition wall 113. Therefore, a part of the circuit board 107 is spatially separated from the second sub-passage 116, and the humidity sensing element 102 is exposed to an airflow 105 of the second sub-passage. FIGS. 1-I and 1-II illustrate cross-sections of the sub-passage which takes in a part of an intake airflow flowing in a main duct, and the circuit cover 109 is mounted to illustrate a passage configuration. FIGS. 1-I and 1-II illustrate an example in which the circuit cover 109 is a member for configuring respective sub-passages. FIG. 1-I illustrates a cross-sectional shape of a first sub-passage 115, and FIG. 1-II illustrates a cross-sectional shape of the second sub-passage 116 which causes an airflow branched from the first sub-passage to flow to the humidity sensing element. These first sub-passage 115 and second sub-passage 116 are partitioned by a first sub-passage/second sub-passage partition wall 114 and respectively configure independent sub-passages. Further, a throttle part 101 for preventing passage of an airflow 104 in the first sub-passage is provided at a center portion of the first sub-passage 115. The airflow 104 flowed in from a right side in FIG. 1-I through an inlet of the first sub-passage 115 flows into the second sub-passage 116 through an inflow passage (A) leading from the first sub-passage 115 to the second sub-passage 116, thereby configuring the airflow 105 in the second sub-passage. After contacting the humidity sensing element 102 mounted on the circuit board 107, the second sub-passage 116 is again joined with the first sub-passage 115 through an outflow passage (B) leading from the second sub-passage 116 to the first sub-passage 115. A passage cross-sectional area of the inflow passage (A) leading from the first sub-passage 115 to the second sub-passage 116 and of the outflow passage (B) leading from the second sub-passage 116 to the first sub-passage 115 is smaller than that of the first sub-passage 115. Further, the inflow passage (A) leading from the first sub-passage 115 to the second sub-passage 116 and the outflow passage (B) leading from the second sub-passage 116 to the first sub-passage 115 are connected to the first sub-passage 115 at an angle. Accordingly, a rate of the airflow flowing into the second sub-passage 116 is smaller than a rate of the airflow passing through the first sub-passage 115, and a velocity thereof is also slower. Therefore, contaminants with a velocity and a large mass advance straight in the first sub-passage 115 by inertia as they are, and only gas desired to be measured and contaminants having an insignificant effect are flowed into the second sub-passage 116. This can greatly reduce the contaminants that reach the humidity detection element 102.

However, a balance between a flow velocity in the second sub-passage 116 and a flow velocity in the first sub-passage 115 is important in a sorting action of contaminants. For example, when the flow velocity in the second sub-passage 116 is too slow, an exchange velocity of air around the humidity detection element 102 or gas to be measured lowers, and responsiveness of humidity detection is deteriorated. Conversely, when the flow velocity in the second sub-passage 116 is too fast, the contaminants are sucked into the second sub-passage 116 or partially flowed backward. Accordingly, the above-described sorting action of contaminants does not function sufficiently. Further, a relationship between the flow velocity in the first sub-passage 116 and the flow velocity in the second sub-passage 115, for example, a flow velocity ratio is stable even when an average flow velocity in an entire main duct varies, and detection responsiveness is constant even when a flow velocity in the main duct varies, is especially important for a humidity sensor for an automobile.

For this stability, it is necessary that negative pressure for creating the airflow in the second sub-passage 116 is stable. Since this negative pressure is caused by the airflow in the first sub-passage 115 which flows in an inlet and an outlet of the second sub-passage 116 in a shearing direction, it is required that the flow in the shearing direction in vicinities of the inlet and the outlet of the second sub-passage 116 is stable. Therefore, the inlet and the outlet of the second sub-passage 116 need to be provided at positions where airflow separation or compression action is not generated. Particularly, the flow velocity in the shearing direction is extremely slow in a region where the airflow separation is generated compared with its periphery, and also a distance between the region and a site with a high flow velocity is not large. Accordingly, when the inlet and the outlet of the second sub-passage exist in such a region, stable negative pressure is not generated due to generation of new swirl flow or partial reverse flow.

As a result, the flow velocity in the second sub-passage 116 is not stable, and the relationship between the flow velocity in the first sub-passage 115 and the flow velocity in the second sub-passage 116 becomes unstable. Eventually, the above-described sorting action of contaminants does not function sufficiently, and the humidity detection element 102 is contaminated.

Figure 2:
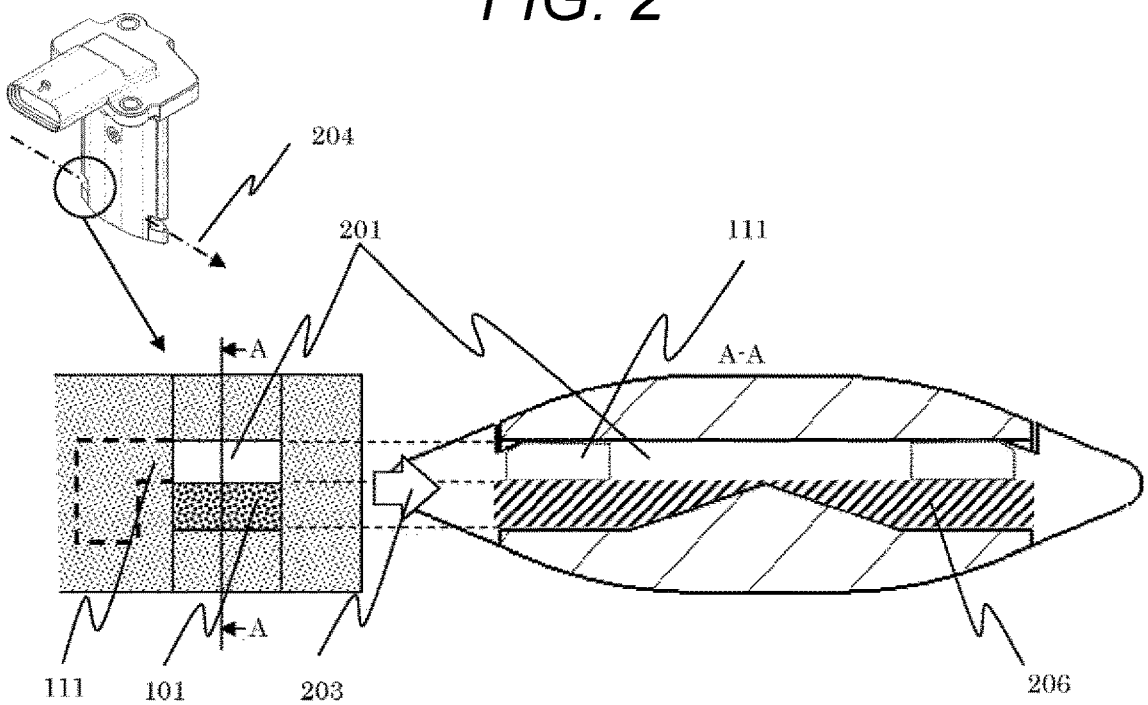
FIG. 2 are diagrams illustrating a positional relationship between a first sub-passage, a throttle, and an inlet and an outlet of a second sub-passage.
Figure 3:
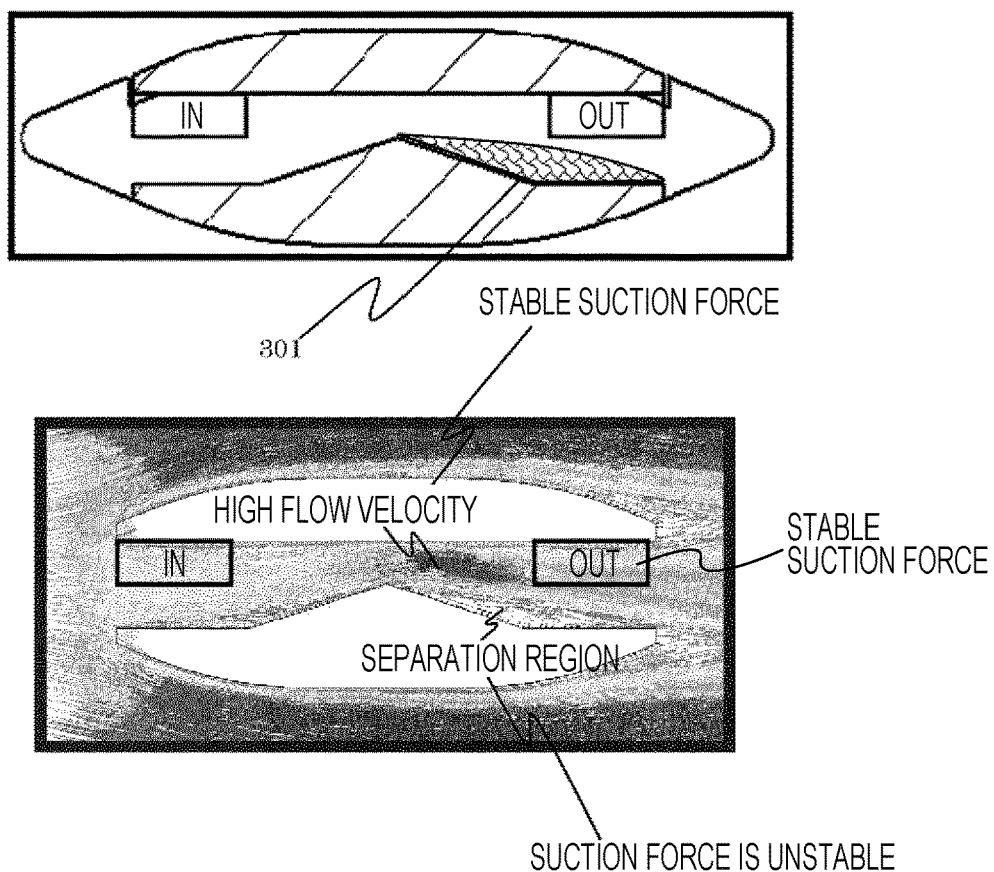
FIG. 3 are diagrams illustrating separation of an airflow caused by the throttle.

FIG. 2 are diagrams of the first sub-passage 115 cut in a direction in which the inlet and the outlet of the second sub-passage 116 can be seen. In the present embodiment, the throttle of the first sub-passage 115 is provided only on one side with respect to a flowing method of air. However, the throttle may be provided on both sides. Further, the humidity sensor is not generally affected in a flowing direction of airflow. Accordingly, in the present embodiment, positions of the inlet and the outlet of the first sub-passage 115 and positions of an outlet 110 and an inlet 111 of the second sub-passage are symmetrical to a center axis of the temperature and humidity sensor so that the temperature and humidity sensor can be mounted in both directions with respect to the flow. Therefore, the inlet 111 of the second sub-passage serves as the outlet 110 of the second sub-passage in the flow in a reverse direction and can be regarded as the inlet or the outlet of the second sub-passage. Further, in the subsequent description, the first sub-passage 115 is projected from an upstream to downstream direction of the flow, a portion which passes through an inside of the first sub-passage 115 as it serves as a straight advance region 201, and a portion which has a throttle and causes compression or separation of the flow serves as a throttle region 206.

Figure 4A:
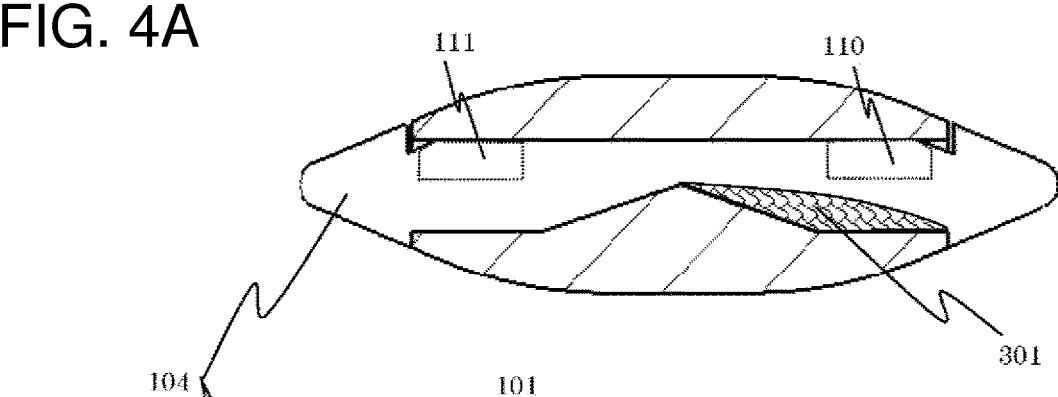
FIGS. 4A to 4C are diagrams illustrating a positional relationship between the inlet and the outlet of the second sub-passage and a region where the separation is generated.
Figure 4B:
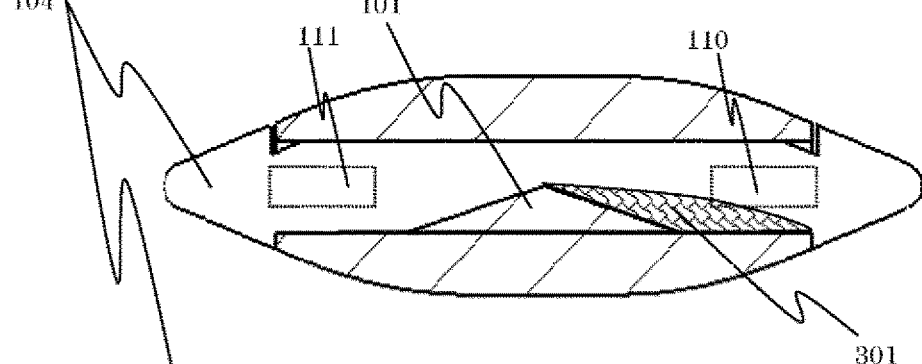
Figure 4C:
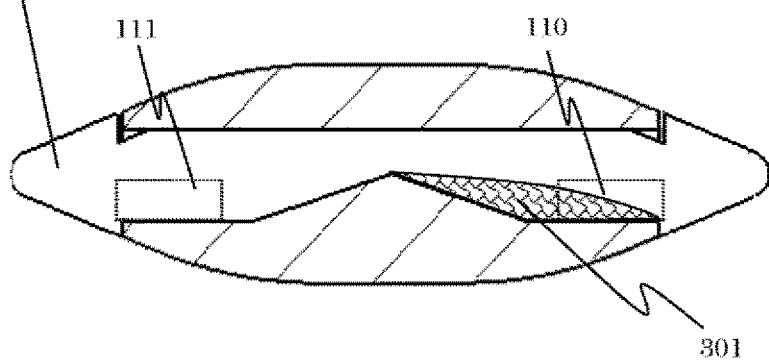

FIGS. 4A to 4C illustrate a relationship between the positions of the outlet 110 and the inlet 111 of the second sub-passage inside the first sub-passage 115 and a separation region 301 where separation of airflow caused by the throttle part 101 is generated. In FIG. 4A, the outlet 110 and the inlet 111 of the second sub-passage exist only in the above-described straight advance region 201. Accordingly, the outlet 110 and the inlet 111 are not affected by the separation region 301 caused by the throttle, and the flow velocity of gas in the second sub passage 116 is stable.

As a result, the flow velocity relationship between the first sub-passage 115 and the second sub-passage 116 can be kept substantially constant in a flow velocity range of the wide main duct, and eventually, responsiveness of humidity detection, anti-contamination, and the like can be improved.

FIG. 4B illustrates a case where the outlet 110 and the inlet 111 of the second sub-passage are moved into the throttle region 206. When the inlet and the outlet are arranged at such positions, the separation region 301 partially overlaps the outlet 110 of the second sub-passage. Accordingly, the flow velocity in the main duct becomes large, and when the separation region extends over a wide range or the like, the flow velocity relationship between the second sub-passage 116 and the first sub-passage 115 becomes unstable.

Further, FIG. 4C illustrates a case where the outlet 110 and the inlet 111 of the second sub-passage exist in the throttle region 206. Since about half of region of the outlet 110 of the second sub-passage overlaps the separation region 301, in such an arrangement, the flow velocity relationship between the second sub-passage 116 and the first sub-passage 115 becomes more unstable in the flow velocity range of the wide main duct.

In this way, the positions of the outlet 110 and the inlet 111 of the second sub-passage provided inside the first sub-passage 115 are important in order to improve responsiveness or anti-contamination of the temperature and humidity sensor. The suitable positions exist, and the best result can be obtained from the positions in FIG. 4A.

Figure 5A:
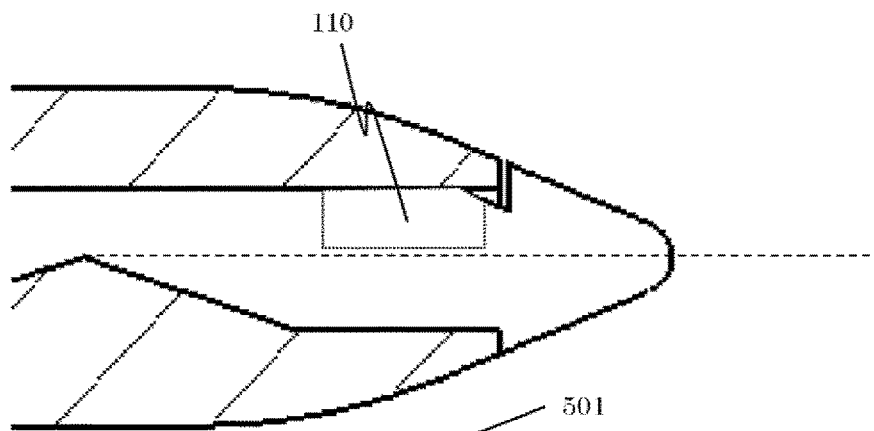
FIGS. 5A to 5D are diagrams illustrating a plurality of embodiments relating to positions of the inlet and the outlet of the second sub-passage.
Figure 5B:
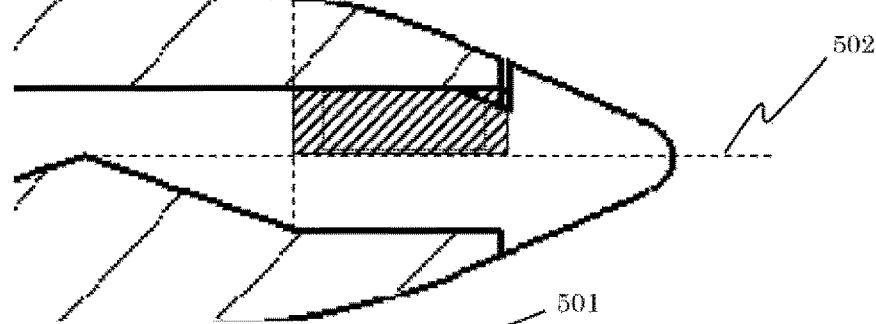

The most suitable positions are positions defined in FIG. 5B, located further on a side where the throttle part 101 does not exist than a throttle vertex line 502 with respect to the flowing direction, and located on an outer side of the throttle than a throttle starting line 501 drawn from a starting point of the throttle. In other words, the most suitable positions are positions located further on the side of the region where the throttle does not exist than an intersection between the throttle starting line 501 and the throttle vertex line 502.

Hereinabove, according to the aforementioned configuration, contamination of the humidity detection element 102 caused by contaminants can be prevented even when the temperature and humidity sensor is compact. Eventually, performance and reliability of the temperature and humidity sensor can be maintained in an initial state over a long term, and the temperature and humidity sensor with improved reliability more than conventional ones can be provided.

Further, since excellent gas exchange can be performed, a response delay at the time of detecting humidity is shortened, and control responsiveness of a vehicle or an internal combustion engine using these information improves. These allow improvement of performances, such as exhaust gas, fuel consumption, safety, and comfort, of a vehicle. Further, since sufficient anti-contamination can be performed without using a membrane film, a price of the temperature and humidity sensor can be reduced.

Embodiment 2

Figure 5C:
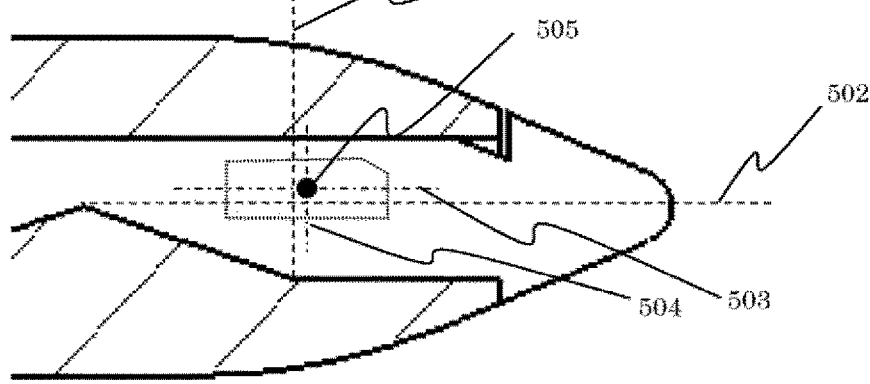

FIG. 5C illustrates an embodiment of a case where an outlet 110 and an inlet 111 of a second sub-passage cannot be arranged at the positions in the aforementioned Embodiment 1. A reference for positions of the outlet 110 and the inlet 111 of the second sub-passage serves as an area center 505. This area center 505 is at a position which exists further on a side where a throttle does not exist than an intersection between a throttle starting line 501 and a throttle vertex line 502. In the present embodiment, stability is slightly inferior to that of Embodiment 1. However, since the positions of the outlet 110 and the inlet 111 of the second sub-passage can be arranged further on the side of the throttle than Embodiment 1, an internal configuration of the entire temperature and humidity sensor can be improved. Particularly, it is more effective when the temperature and humidity sensor is desired to be made small. An effect of the present invention can be obtained even by such an arrangement.

Embodiment 3

Figure 5D:
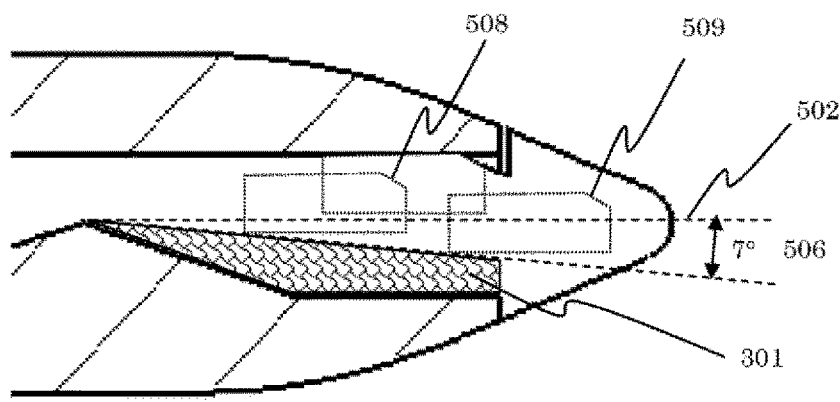

FIG. 5D illustrates an embodiment in which positions of an outlet 110 and an inlet 111 of a second sub-passage capable of obtaining the same effect as the aforementioned embodiments are determined according to a generation region of an airflow separation 301. A line having an angle 506 in a throttle direction using a throttle vertex line 502 as a reference is provided in a region which does not go beyond a throttle side. In other words, the outlet 110 and the inlet 111 of the second sub-passage are arranged at a position 508 or a position 509. This angle 506 is set at seven degrees. Since a separation phenomenon start spread angle in a spread pipe is seven degrees, separation is generated within the pipe which spreads at an angle larger than this. According to this embodiment, it is configured that a degree of freedom in positions of the outlet 110 and the inlet 111 of the second sub-passage is further enhanced and that the effect of Embodiment 1 can be also maintained.

Embodiment 4

Hereinafter, an embodiment of the present invention will be further described in detail by using FIGS. 6 and 7.

Generally, a physical quantity sensor has a drawback in that measurement accuracy is deteriorated and an error is generated by a thermal effect from external environment and an effect of self-heating of the sensor. It is necessary to take measures to reduce the measurement error electrically or structurally. Particularly, in an internal combustion engine, a space within an engine room has become smaller in recent years due to size reduction of the engine and a temperature rise within the engine room tends to increase. The sensor used for an intake pipe coupled to a combustion chamber of the internal combustion engine generally secures operation between −40° C. and +125° C.

For example, in a technique described in WO 2012/055622, a humidity sensor is arranged in a housing of a mass weighing instrument, the humidity sensor is arranged on a circuit board different from a circuit board including a heating component, and structural measures are taken. In this case, the circuit board for arranging an electric component (e.g., a microprocessor) and the circuit board for arranging the humidity sensor are respectively needed. This leads to an increase in the number of components and a mounting space, and there is room for improvement in terms of cost.

Therefore, an object of the subsequent embodiments is to provide a highly accurate temperature and humidity measurement device which suppresses a thermal effect on a sensor.

Figure 6:
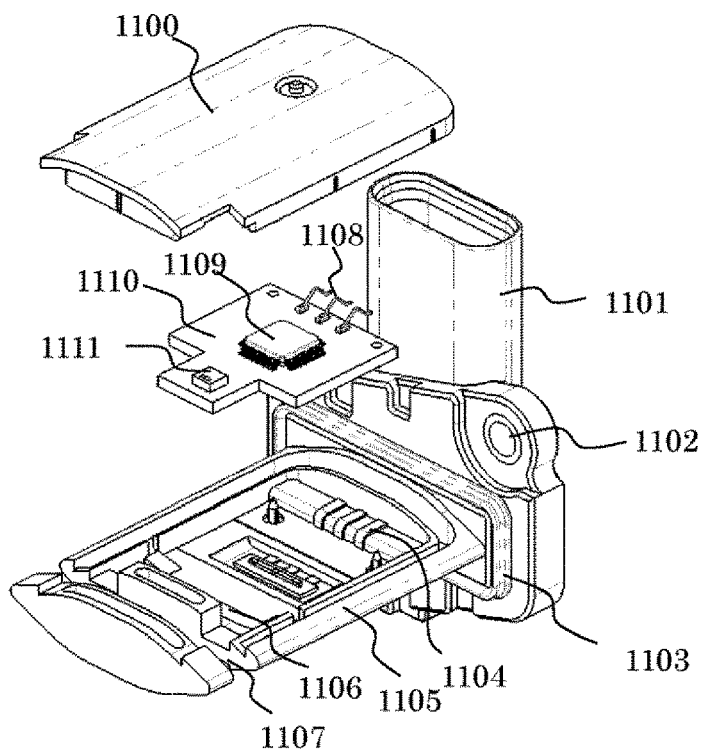
FIG. 6 is an example of a configuration diagram of a temperature and humidity measurement device.

FIG. 6 is an example of a configuration diagram of a humidity measurement device of the present embodiment. The temperature and humidity measurement device used for the internal combustion engine is normally arranged in a downstream part of an air cleaner. Then, the temperature and humidity measurement device is inserted into an intake pipe or a dedicated duct 1300 coupled to the air cleaner.

Here, the air cleaner has a filter element which filters dust or the like in air, and is installed in a most upstream part of the intake pipe coupled to the internal combustion engine in order to take clean air into the intake pipe. In the temperature and humidity measurement device, a case part including a circuit board 1110 and the like is inserted into the intake pipe or an opening part of the dedicated duct 1300, and a portion of a bush 1102 is tightened and fixed by a screw (not illustrated). Further, fluid leakage from the intake pipe duct or the dedicated duct and entry of dust or the like from the external environment are prevented by providing a gasket 1103 molded of a rubber material. An effect of a heat source within the engine room on the circuit board 1110 and the like can be restrained by inserting the case of the temperature and humidity measurement device into the intake pipe or the dedicated duct 1300.

The temperature and humidity measurement device includes the case configured by a housing 1105 and a cover 1100, a first sub-passage 1107 and a second sub-passage 1106 formed in shapes of inner walls of the housing 1105 and the cover 1100, the circuit board 1110 arranged within the case, and a temperature and humidity sensor 1111 which detects temperature and relative humidity in the air flowing in the second sub-passage.

The housing 105 molded of a resin material includes a connector terminal 1104 and a connector pin 1112 formed of metal members, and a connector 1101 shape mechanically connected with a connector on an engine control unit (hereinafter ECU) side. The connector terminal 1104 and the connector pin 1112 are insert-molded during resin molding of the housing 1105, and the connector terminal 1104 is electrically connected with the circuit board 1110 via a metal wire 1108. Meanwhile, the connector pin 1112 is electrically connected with the ECU on a vehicle side via a harness.

In order to protect the circuit board 1110, the temperature and humidity sensor 1111, the metal wire 1108, and the like arranged within the housing 105, the cover 100 molded of a resin material is engaged with a groove shape provided on an outer periphery of the housing 1105 and is adhesively fixed thereto.

Figure 7:
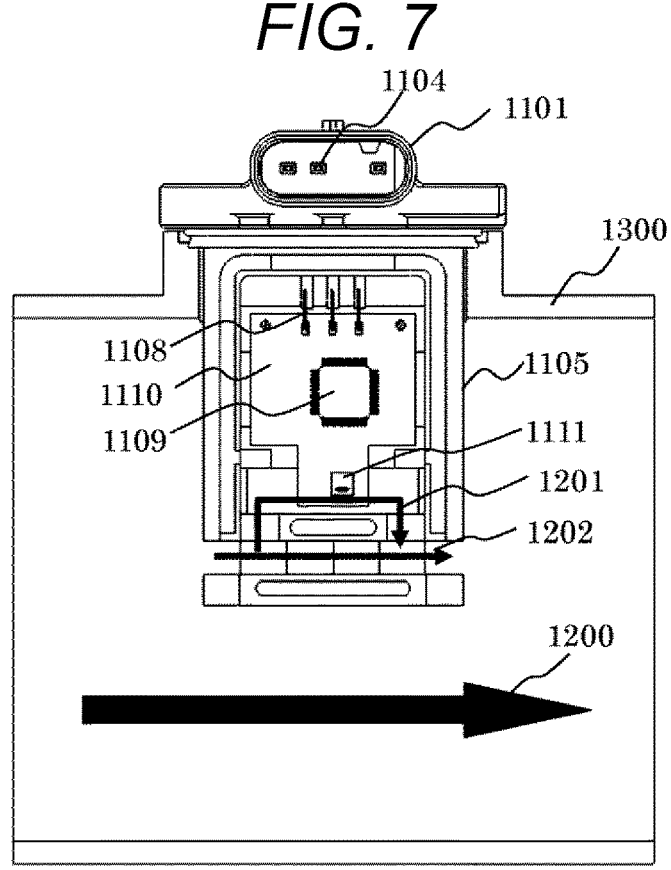
FIG. 7 is an example in which the temperature and humidity measurement device including an intake pipe is mounted (except a cover 1100).

FIG. 7 illustrates a form of the temperature and humidity measurement device inserted into the intake pipe or the dedicated duct 1300. However, the cover 1100 is omitted in FIG. 7 for convenience of explanation. As illustrated in FIG. 7, the circuit board 1110 has a role of electrically connecting an electric output signal from the temperature and humidity sensor 1111, which detects the temperature and the relative humidity in the air, to the ECU via a microprocessor 1109. The circuit board 1110 is adhered or mechanically fixed to a vicinity of a center within the housing 1105 and is disposed so that a portion, in which the temperature and humidity sensor 1111 is arranged, is exposed to an inside of the second sub-passage 1106. Here, the microprocessor 1109 has a role of converting the electric signal of the temperature and humidity sensor 1111 into a signal which can be processed by the ECU. The temperature and humidity sensor 1111 includes a temperature sensor element and a relative humidity sensor element which output an electric signal according to temperature and relative humidity in the air.

An air 1202 flowing in the first sub-passage 1107 and an air 1201 flowing in the second sub-passage 1106 configured inside the case of the housing 1105 and the cover 1100 are configured to take in a portion of an airflow 1200 flowing in the intake pipe. Further, the second sub-passage 1106 has an opening part so as to cause a portion of the air 1202 flowing in the first sub-passage 1107 to bypass.

Figure 8:
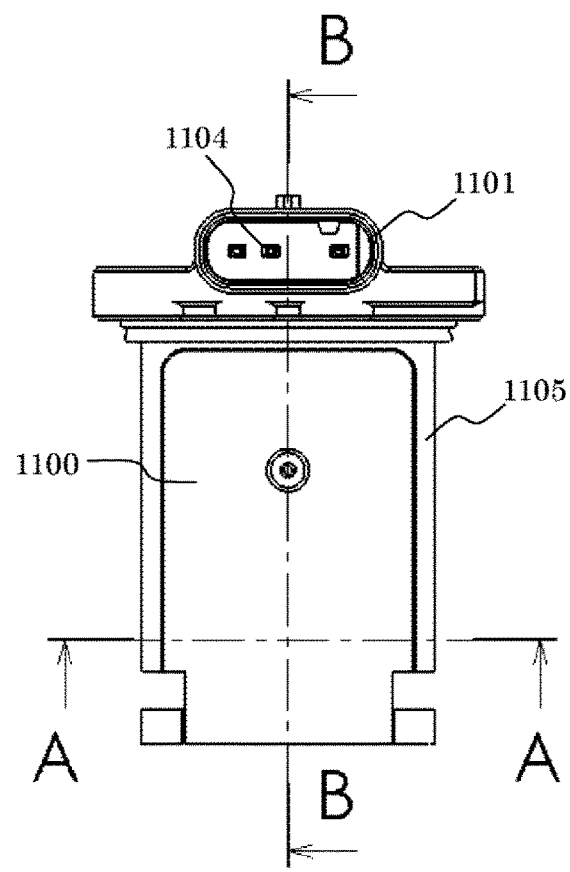
FIG. 8 is a front view of the temperature and humidity measurement device.
Figure 9:
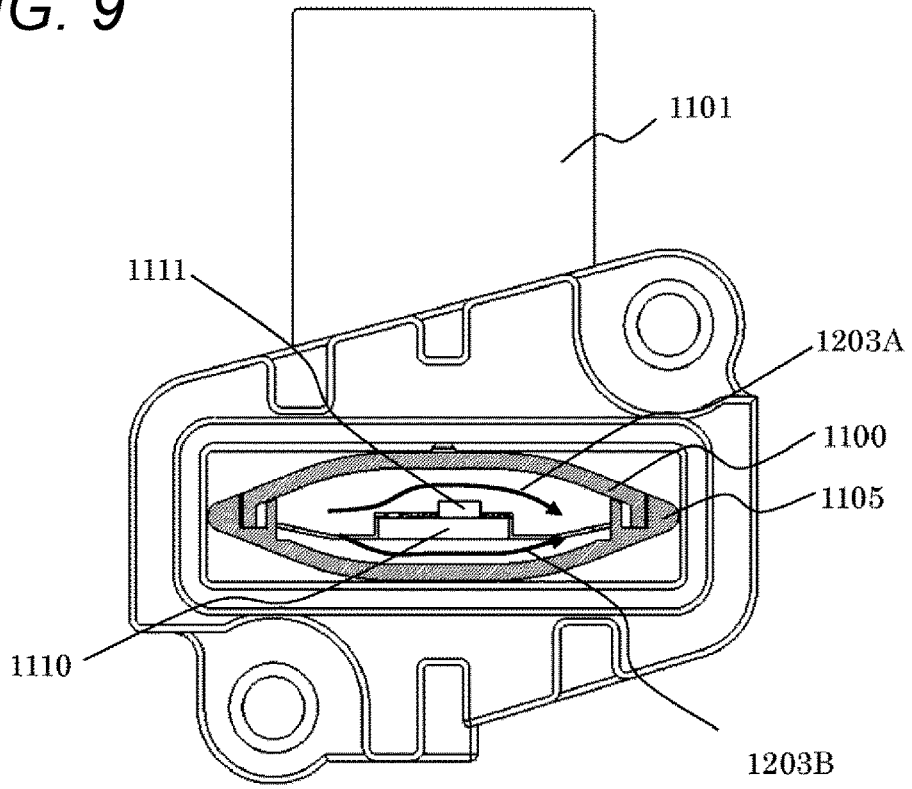
FIG. 9 is a diagram illustrating an A-A cross section in FIG. 8.
Figure 10:
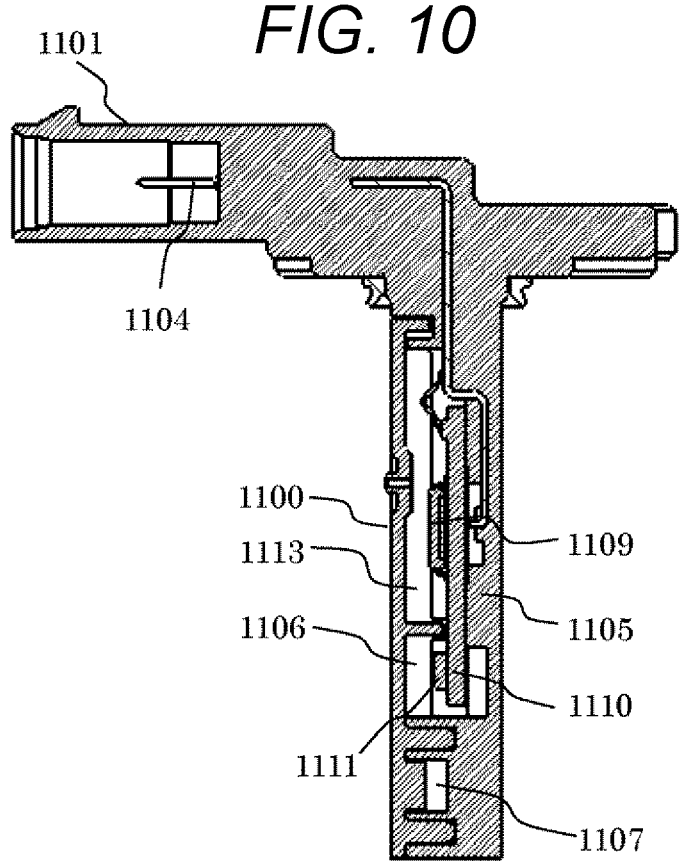
FIG. 10 is a diagram illustrating a B-B cross section in FIG. 8.
Figure 11:
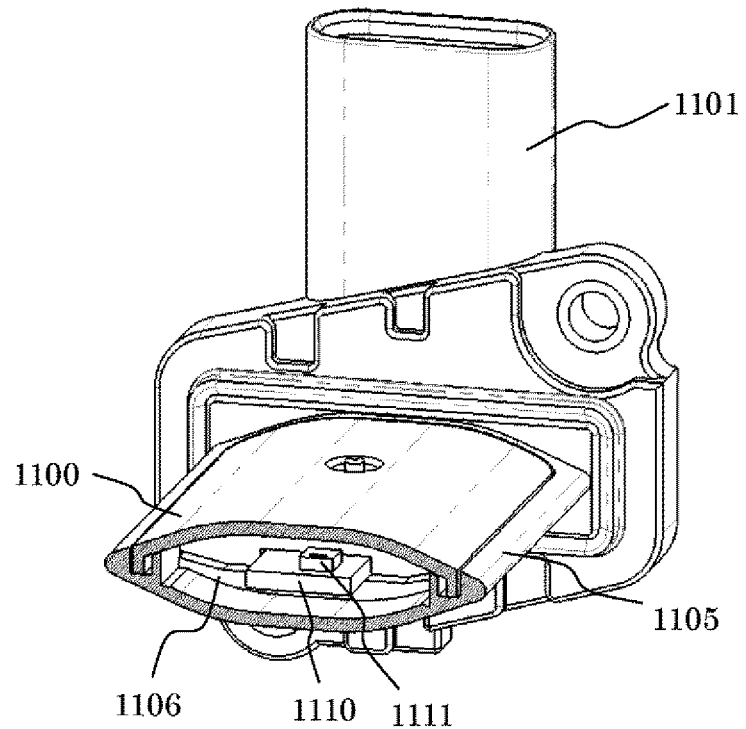
FIG. 11 is a diagram illustrating an inclined view of FIG. 9.

Here, a positional relationship between the first sub-passage 107, the second sub-passage 1106, and the temperature and humidity sensor 1111 will be described in detail with reference to FIGS. 8 to 11. FIG. 8 is a front view of the temperature and humidity measurement device. FIG. 9 illustrates an A-A cross section in FIG. 8. FIG. 10 illustrates a B-B cross section in FIG. 8. FIG. 11 illustrates an inclined view of FIG. 9.

As illustrated in FIGS. 9 and 11, the portion of the temperature and humidity sensor 1111 arranged on the circuit board 1110 is arranged so as to be exposed to the inside of the second sub-passage 1106, and the circuit board 1110 is located in a vicinity of a center of a cross section of the second sub-passage 1106. With this configuration, the air 1201 in the second sub-passage 1106 is divided into an air 1203A flowing on a front surface of the circuit board 1110, on which the temperature and humidity sensor 1111 is arranged, and an air 1203B flowing on a rear surface of the circuit board 1110. In other words, the air 1203A flowing on the front surface of the circuit board 1110 and the air 1203B flowing on the rear surface of the circuit board cool the temperature and humidity sensor 1111 and the circuit board 1110, thereby suppressing a temperature rise due to self-heating or the like. Generally, in a case where there is temperature difference between a material and a flow rate, heat transfer occurs from one with higher temperature to one with lower temperature and the temperatures are in an equilibrium state in a certain condition. For example, in a case where a temperature of the material is higher than that of a fluid, a heat transfer velocity changes according to a velocity of the fluid, and the heat transfer from the material becomes faster as the velocity thereof is higher.

As illustrated in FIG. 10, the second sub-passage 1106 is formed in the shape of the inner wall of the housing 1105 and the cover 1100, and a circuit chamber 1113 and the second sub-passage 1106 are structurally separated. This can suppress an effect of self-heating of the electronic component (e.g., the microprocessor 1109) arranged on the circuit board 1110 exerted on the temperature and humidity sensor 1111. In other words, the second sub-passage 1106 takes in a portion of the air flowing in the intake pipe, heat transfer between the air and the circuit board 1110 including the temperature and humidity sensor 1111 is promoted, the air can be cooled, and the self-heating and the thermal effect from the heating component can be suppressed.

Figure 12:
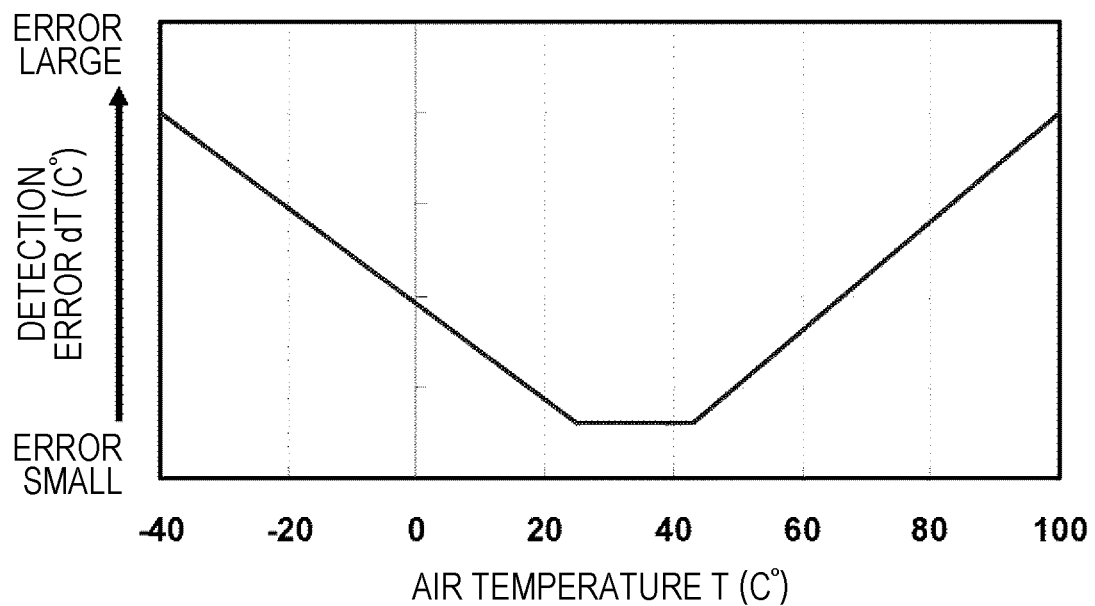
FIG. 12 is a graph example illustrating a detection error tendency in a temperature sensor.

As an example, FIG. 12 illustrates a detection error to an air temperature of the temperature sensor. As illustrated in FIG. 12, the detection error tends to increase as the temperature becomes high. It is important to suppress the temperature rise of the sensor element in securing sensor accuracy.

As described above, the effect of temperature within the engine room and the self-heating of the electronic component, such as the microprocessor 1109 or the temperature and humidity sensor 1111 on the circuit board 1110, are suppressed by taking structural measures. Accordingly, highly accurate measurement can be expected, and the temperature and humidity sensor 1111 can be arranged on one sheet of the circuit board 1110. It is possible to provide the inexpensive temperature and humidity measurement device by reducing the number of parts.

Embodiment 5

Next, Embodiment 5 serving as another embodiment of the present invention will be described. In the previous Embodiment 4, description has been given of an example of the temperature and humidity measurement device provided with the first sub-passage 1107 and the second sub-passage 1106 which take in the portion of the air 1200 flowing in the intake pipe. In the present embodiment, an example of a temperature and humidity measurement device configured only by a first sub-passage 1107 which takes in a portion of an air 1200 flowing in an intake pipe is described.

Figure 13:
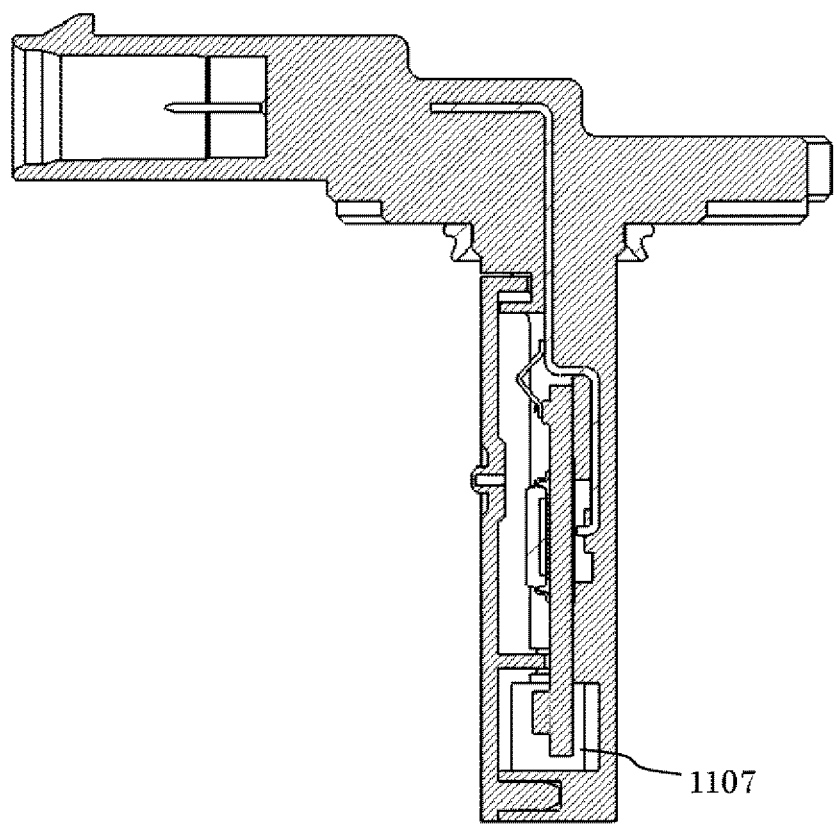
FIG. 13 is an example of a configuration diagram of a temperature and humidity measurement device having a sub-passage configuration different from the one in FIG. 6.

FIG. 13 is an example of a configuration diagram illustrating the temperature and humidity measurement device which has only the first sub-passage with the same shape as the second sub-passage 1106 illustrated in Embodiment 4. In the humidity measurement device in FIG. 13, descriptions of configurations which have been already described, illustrated in FIGS. 6 and 7, and marked with the same reference signs and of parts having the same functions are omitted. In Embodiment 5, the first sub-passage 1107 is formed in the same configuration as the second sub-passage in Embodiment 1, and it is possible to obtain a similar suppression effect on a thermal effect.

REFERENCE SIGNS LIST

101 throttle part
102 humidity detection element
103 integrated circuit
104 airflow of first sub-passage
105 airflow of second sub-passage
106 sensor flange
107 circuit board
108 sensor housing
109 circuit cover
110 second sub-passage outlet
111 second sub-passage inlet
112 electrical connection connector
113 circuit chamber/second sub-passage partition wall
114 first sub-passage/second sub-passage partition wall
115 first sub-passage
116 second sub-passage
201 straight advance region
203 direction of fair current
206 throttle region
301 separation region
501 throttle starting line
502 throttle vertex line
505 area center
506 line with angle of seven degrees
1100 cover
1101 connector
1102 bush
1103 gasket
1104 connector terminal
1105 housing
1106 second sub-passage
1107 first sub-passage
1108 metal wire
1109 microprocessor
1110 circuit board
1111 temperature and humidity sensor
1112 connector pin
1113 circuit chamber
1200 direction of airflow in intake pipe
1201A direction of airflow flowing in second sub-passage
1202 direction of airflow flowing in first sub-passage
1203A direction of airflow flowing on front surface of circuit board
1203B direction of airflow flowing on rear surface of circuit board
1300 intake pipe or dedicated duct

The invention claimed is:

1. A temperature and humidity sensor in which all or part of a case of the temperature and humidity sensor is inserted into a main duct for causing gas to pass through and which detects humidity of the gas, the temperature and humidity sensor comprising:
a first sub-passage configured as a part of the case, a part of the gas passing through the main duct flowing in the same direction as a flow in the main duct;
a throttle section provided between an inlet and an outlet of the first sub-passage and on an inner surface of the first sub-passage, the throttle section having a throttle whose cross-sectional area is smaller than an average cross-sectional area of the entire first sub-passage; and
a second sub-passage which connects an upstream side and a downstream side of the throttle section and is different from the first sub-passage, wherein
the first sub-passage and an inlet and an outlet of the second sub-passage are connected via respective connection ports,
the connection port between the inlet of the second sub-passage and the first sub-passage or the connection port between the outlet of the second sub-passage and the first sub-passage is provided on a side where a throttle is not provided when viewed from an axis in an upstream and downstream direction of the flow in the first sub-passage, and
a throttle vertex line passes through the outlet and the inlet of the second sub-passage.

2. The temperature and humidity sensor according to claim 1, wherein any portion of the connection port is not located on the side where the throttle exists by going beyond the vertex of the throttle and is located at a position away from a starting point of the throttle.

3. The temperature and humidity sensor according to claim 1, wherein a portion of an opening part of the connection port is located further on a vertex side of the throttle than the starting point of the throttle or on a side where the throttle is provided, and
a center point of a cross section of the connection port is provided further away from the throttle than the starting point of the throttle, and the center point is not located on the side where the throttle exists by going beyond the vertex of the throttle.

4. The temperature and humidity sensor according to claim 1, wherein any portion of the connection port is not located on a throttle side where an angle from the vertex of the throttle to the throttle side exceeds seven degrees.

5. The temperature and humidity sensor according to claim 1, wherein change in the cross-sectional area between the inlet and the outlet of the flow of the first sub-passage is symmetrical with the vertex of the throttle as a center.

6. A temperature and humidity sensor in which all or part of a case of the temperature and humidity sensor is inserted into a main duct for causing gas to pass through and which detects humidity of the gas, the temperature and humidity sensor comprising:
a first sub-passage configured as a part of the case, a part of the gas passing through the main duct flowing in the same direction as a flow in the main duct;
a throttle section provided between an inlet and an outlet of the first sub-passage and on an inner surface of the first sub-passage, the throttle section having a throttle whose cross-sectional area is smaller than an average cross-sectional area of the entire first sub-passage;
a separation region where separation of airflow caused by the throttle section is generated; and
a second sub-passage which connects an upstream side and a downstream side of the throttle section and is different from the first sub-passage, wherein
the first sub-passage and an inlet and an outlet of the second sub-passage are connected via respective connection ports,
the connection port between the inlet of the second sub-passage and the first sub-passage or the connection port between the outlet of the second sub-passage and the first sub-passage is provided on a side where a throttle is not provided when viewed from an axis in an upstream and downstream direction of the flow in the first sub-passage, and
a throttle vertex line passes through the outlet and the inlet of the second sub-passage.

7. The temperature and humidity sensor according to claim 6, wherein any portion of the connection port is not located on a side where the throttle exists by going beyond a vertex of the throttle.

8. The temperature and humidity sensor according to claim 6, wherein any portion of the connection port is not located on the side where the throttle exists by going beyond the vertex of the throttle and is located at a position away from a starting point of the throttle.

9. The temperature and humidity sensor according to claim 6, wherein a portion of an opening part of the connection port is located further on a vertex side of the throttle than the starting point of the throttle or on a side where the throttle is provided, and
a center point of a cross section of the connection port is provided further away from the throttle than the starting point of the throttle, and the center point is not located on the side where the throttle exists by going beyond the vertex of the throttle.

10. The temperature and humidity sensor according to claim 6, wherein change in the cross-sectional area between the inlet and the outlet of the flow of the first sub-passage is symmetrical with the vertex of the throttle as a center.

* * * * *